United States Patent

[11] 3,610,966

[72] Inventor Joseph J. Barber
Williamsville, N.Y.
[21] Appl. No. 839,026
[22] Filed July 3, 1969
[45] Patented Oct. 5, 1971
[73] Assignee Houdaille Industries, Inc.
Buffalo, N.Y.

[54] VARIABLE TIMING, CONTROL AND INDICATING CIRCUIT
19 Claims, 3 Drawing Figs.

[52] U.S. Cl. .......... 307/293, 307/215, 307/247, 307/283, 307/252 B
[51] Int. Cl. .......... H03k 17/28
[50] Field of Search .......... 328/46, 48, 49, 51, 129; 307/223, 225, 215, 293, 294, 247, 283, 252 B

[56] References Cited
UNITED STATES PATENTS

| | | | |
|---|---|---|---|
| 3,044,065 | 7/1962 | Barney et al. | 328/48 X |
| 3,096,483 | 7/1963 | Ransom | 328/48 |
| 3,183,369 | 5/1965 | Lauer | 307/215 |
| 3,233,116 | 2/1966 | Watrous | 307/225 |
| 3,523,252 | 8/1970 | Chikli-Pariente | 307/215 X |
| 3,480,801 | 11/1969 | Smith | 307/293 |

*Primary Examiner*—John S. Heyman
*Attorney*—Hill, Sherman, Meroni, Gross and Simpson

ABSTRACT: A variable timing and control circuit providing repetitive control periods of variable duration at variable repetition rates, and providing a continuous and intermittent control function during the control periods, in which a first timing circuit comprising an adjustable relaxation oscillator and a counting circuit operable to determine the duration of a control period, and a second timing circuit comprising a second adjustable relaxation oscillator and a second counting circuit is operable to determine the interval between control periods, a decoding circuit being connected to the outputs of the counting circuits operable to alternately initiate and terminate operation of the respective timing circuits and to provide signals responsive thereto, a logic circuit, responsive to signals from the decoding circuit, comprising a plurality of gates circuited to provide control and indicator functions in dependence upon said signals and upon predetermined operation of the mechanism to be controlled, and means controlled by said logic circuit for providing an intermittent control function during said control periods.

INVENTOR
Joseph J. Barber

BY Hill, Sherman, Meroni, Gross & Simpson
ATTORNEYS

INVENTOR
Joseph J. Barber

BY Hill, Sherman, Meroni, Gross & Simpson
ATTORNEYS

VARIABLE TIMING, CONTROL AND INDICATING CIRCUIT

BACKGROUND OF THE INVENTION

The present invention is directed to a timing, control and indicator circuit which may be employed, for example, to control mechanical equipment requiring cyclic operation, in which both the duration of the operative cycle as well as the time periods therebetween may be varied, for example, over a matter of several minutes to 10 or more minutes and, in particular, with devices which include mechanism adapted to be intermittently actuated during the "on" cycle of operation, which intermittent cycle may, for example, involve a matter of seconds. In the past, functions of this type have usually been performed by mechanical or mechanical-electrical devices which have been relatively costly, as well as relatively large and bulky, and have involved movable elements of one type or another. The present invention, therefore, is directed to a device, the basic circuit of which does not require movable parts, all functions being effected by electrical circuitry, other than those associated with movable elements of the controlled mechanism.

BRIEF SUMMARY OF THE INVENTION

The present invention utilizes a circuit for determining the interval between desired periods of operation of a controlled device or mechanism, hereafter referred to as the "program" cycle which, is cooperable with a circuit for determining the duration of the operational cycle, hereafter referred to as the "duration" cycle, whose initiation is determined by the first circuit, both of which cycles may be variably determined over suitable time ranges. Circuit means is also provided for alternately initiating actuation of the respective timing circuits to provide respective program and duration cycles which are alternately repetitive. The respective timing circuits are operative to govern a control and indicator circuit whereby the condition of the circuit at any time may be readily ascertained, the control circuit also being adapted to control the operation of a recycling timing circuit which provides an intermittent or pulsating control cycle throughout the duration cycle.

The control and indicator circuit of the embodiment illustrated is constructed for receipt of suitable signals representative of different operating conditions of the mechanism being controlled, as, for example, representing partial completion of a desired function and total completion of such function. Such signals may be derived, for example, by means including a member, actuated by a movable element of such mechanism or device which has positions representing the desired conditions, hereinafter termed the "function indicating member."

In operation, the controlled mechanism may be "off" or inoperative during the "program" cycle and, upon completion of the latter, a duration cycle is initiated during which the control and indicator circuit provides a continuous "on" control signal to the controlled mechanism and, at the same time, initiates actuation of the recycling timing circuit. Simultaneously therewith such control circuit may also provide an indication that a "duration" cycle is "in program." The length of a "duration" cycle, in such case, may be of a length somewhat longer than the normal time required for the associated "function indicating member" of the controlled mechanism to travel from its initial position, which also represents "completion" of a cycle, to a position indicating partial completion and return to its "completion" position. In the event completion is so effected, the control and indicator circuit may suitably indicate the same, for example, by means of a signal light. However, if such member fails to complete its normal movement from its initial position to the partial position and return to its initial position, the control circuit will, upon completion of the "duration" cycle, correspondingly indicate a failure in functional operation. Upon completion of the "duration" cycle a new "program" cycle will normally be initiated.

The present invention thus provides a circuit which may be readily fabricated with the use of integrated circuits, resulting in a device which, while very efficient in operation, has minimum bulk and mass, as well as providing a high degree of flexibility in its operation.

Other objects, features and advantages of the invention will be readily apparent to those skilled in the art.

BRIEF DESCRIPTION OF THE DRAWINGS

In the drawings, wherein like reference characters indicate like or corresponding parts, and wherein a preferred form of the invention is illustrated, which, as will be apparent therefrom and from the following description, may be capable of various immaterial variations and modifications without departing from the spirit and scope of the novel concepts of the disclosure.

DETAILED DESCRIPTION OF THE INVENTION

Figure 1:
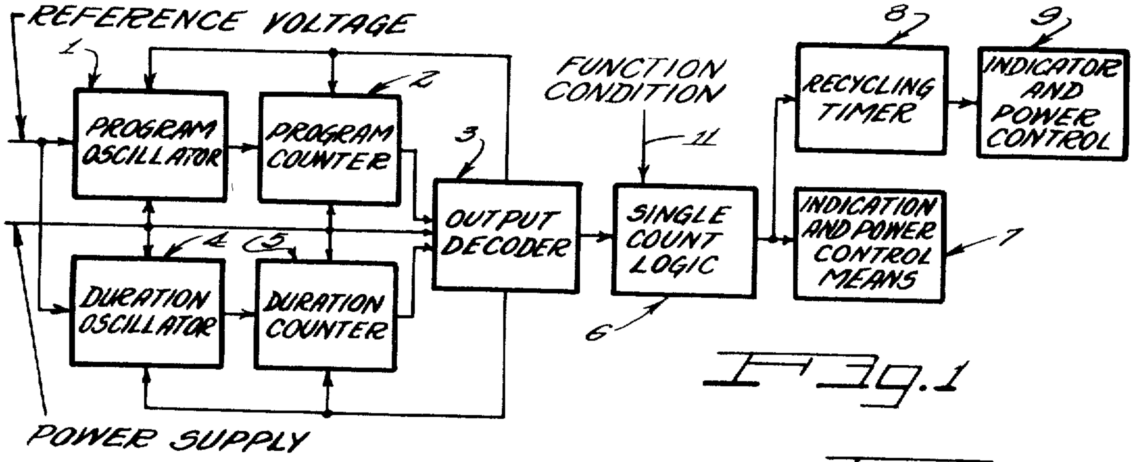
FIG. 1 is a block diagram of a circuit embodying the invention.

Referring to the drawings and, more particularly, to FIG. 1, the reference numeral 1 designates an oscillator or pulse former which provides pulses employed to determine the "program" timing cycle. The output of the "program" oscillator is connected to the input of a program counter 2, which is constructed to count a predetermined number of pulses from the oscillator and, when the desired count has been reached, to transmit a signal to the output decoder 3. By varying the time required for the oscillator to transmit a pulse to the program counter 2, a variable time cycle of considerable length can be achieved. Thus, the time cycle can readily be varied, as desired, within wide limits, the circuit hereinafter subsequently described in detail being readily constructed to provide a program timing, for example, of from 20 minutes to over one hour and 20 minutes in length. Also, operatively connected to the output decoder 3 is a duration oscillator 4 and a duration counter 5, which respectively may be constructed in a manner similar to that of the program oscillator 1 and the program counter 2, and which employ operative parameters which will provide a predetermined desired cycle of operation, for example, 5 to 20 minutes, with the output of the counter 5 being conducted to the output decoder 3.

The output decoder 3 is so constructed that it is operative to control the respective program and duration oscillators, as well as to initiate resetting of the respective counters, the construction being such that during operation of the program oscillator 1 and program counter 2, the duration oscillator 4 is disabled and the duration counter 5 reset. Upon receipt of an output pulse from the program counter 2, the decoder 3 will enable the oscillator 4, disable the program oscillator 1 and reset the program counter 2.

The output of the output decoder 3 is conducted to a single count logic circuit 6 which is responsive to the output signal of the decoder 3 to actuate indication and power control means 7 associated therewith, as well as control the operation of a recycling timer 8 which, in turn, may be operatively connected to indicator and power control means 9.

The general operation of such circuits is as follows:

Assuming that a duration cycle has just been completed, the output decoder will disable the duration oscillator 4 and reset the duration counter 5, at the same time enabling the program oscillator 1. After the program counter 2 has counted the predetermined desired number of pulses from the oscillator 1, a signal will be received at the output decoder 3 whereby the latter is operative to effect a disabling of the oscillator 1, resetting of the counter 2 and an enabling of the duration oscillator 4. During the duration cycle the output decoder will supply a suitable signal to the single count logic circuit 6 which, in turn, will provide a signal to the indication and power control means 7 to make available a continuous control signal for use with the mechanism involved and, at the same time, provide an indication that a duration cycle is "in progress.". As illustrated in FIG. 1, the single count logic circuit is also provided with an input circuit designated by the reference numeral 11, hereinafter referred to as the "function condition" input circuit, which is adapted to be operatively connected with means for indicating the functional condition of the mechanism involved and, in particular, whether the latter has completed a desired cycle within a duration cycle. The "in progress" signal from the circuit 6 is also received at the recycling timer 8 which is thereby enabled, with pulses therefrom being continuously conducted at a fixed frequency to an indicator and power control circuit 9, the latter being operative to provide continuously alternating control conditions and, preferably, indicator means for indicating when the control means is in one of such conditions.

Assuming that the functional condition reflected at the input circuit 11 has been fulfilled before the duration interval is completed, upon completion of such interval and conduction of a signal from the duration counter 5 to the output decoder 3 the respective oscillators and counters will be returned to their initial conditions as previously described, and, at the same time, an output signal from the decoder 3 to the single count logic circuit 6 will provide a corresponding control signal to the means 7, which may also provide an indication that the desired cycle of the mechanism has been properly completed.

However, if a signal supplied to the function condition input circuit 11, or lack of such a signal, indicates a failure of the mechanism to properly complete such cycle, the single count logic circuit will be operative, upon receipt of a signal that the duration cycle has been completed, to provide an indication that a functional failure has taken place.

Irrespective of completion or failure of the desired function, upon receipt of a signal from the output decoder 3 indicating that the duration cycle has been completed, the circuit 6 will effect a disabling of the timer 8 and thus render the indicator and power control circuit 9 inoperative.

Figure 2:
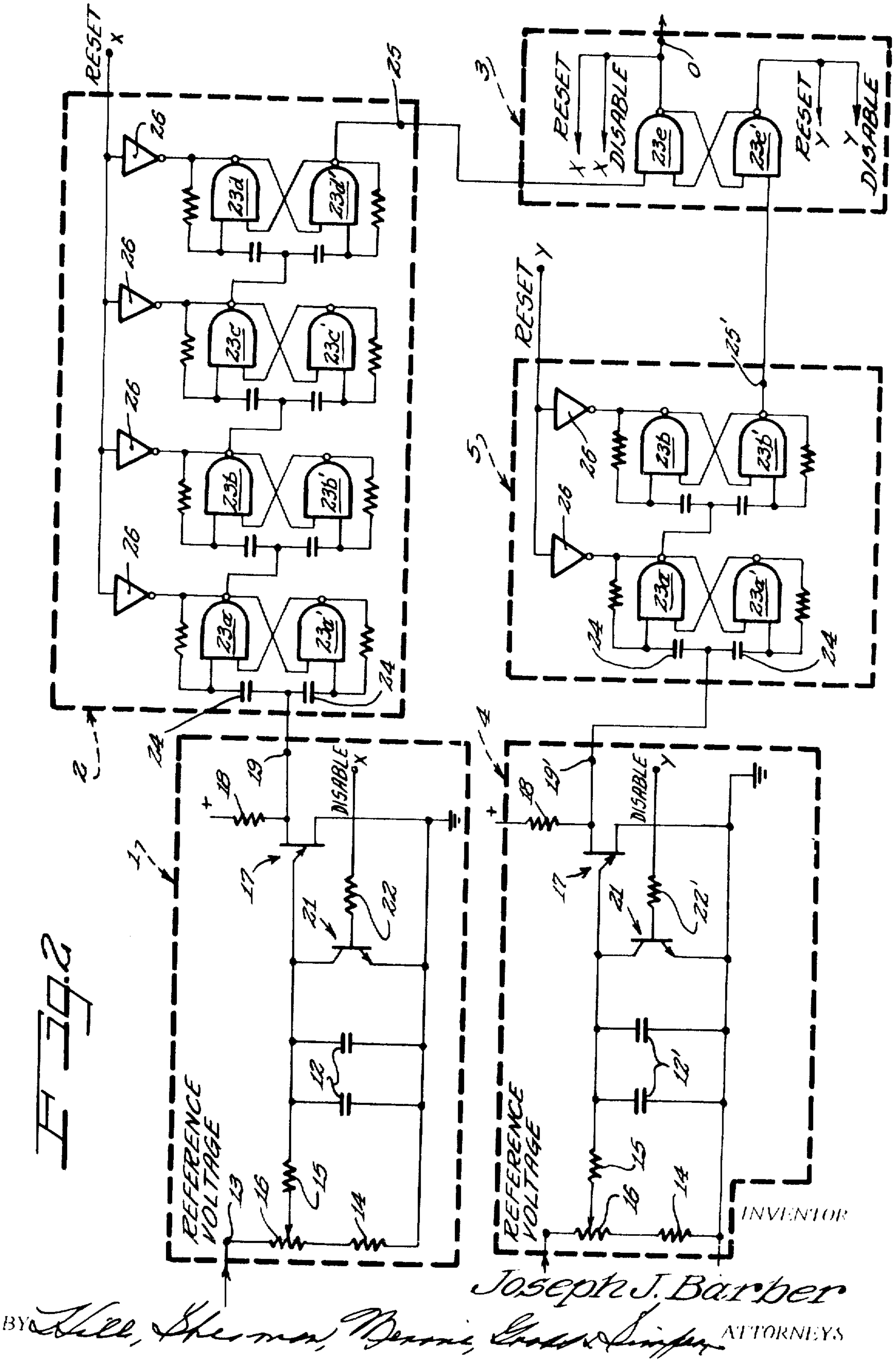
FIG. 2 is a schematic diagram of the oscillator, counter and decoder circuits illustrated in block form in FIG. 1.

The Program And Duration Oscillators–(FIG. 2)

The program oscillator 1 is of the relaxation type and in the embodiment illustrated utilizes a pair of capacitors 12 which are adapted to be charged from a suitably regulated reference voltage source connected to the terminal 13 of a voltage divider network which includes resistances 14, 15 and potentiometer 16, by adjustment of which the magnitude of the charging voltage may be readily varied. Such charging circuit is also connected to the emitter a unijunction transistor 17 having its output electrode connected through a resistance 18 to a positive power supply, with the output terminal 19 being adapted to be connected to the program counter 2. A transistor 21, having its collector and emitter connected to form a shunt circuit across the capacitors 12, has its base connected over a resistance 22 to the disable input X.

Assuming that no disable voltage is applied to the disable input X, the transistor 21 will be nonconductive and capacitors 12 may charge until the voltage at the emitter of the unijunction transistor 17 reaches a value resulting in conduction thereof whereby the capacitors 12 will discharge, resulting in a negative-going pulse at the output terminal 19. In the event a positive voltage is applied to the disable input X, transistor 21 will conduct to prevent charging of the capacitors 12, thereby rendering the oscillator circuit inoperative.

The duration oscillator 4 may be of the same design as the program oscillator 1, with the exception that the capacitance of one or both of the capacitors 12' may be selected to provide a different charging capacity than that provided by the capacitors 12. In both cases the voltage applied to the charging circuit, and thus the time constant involved in the charging thereof may be varied by adjustment of the potentiometer 16 of the associated oscillator circuit, with the time range there provided being dependent upon the total capacitance involved. Thus, time ranges from 2.5 or less minutes to over 10 minutes may be readily achieved by a suitable selection of the circuit components.

The output from the oscillator 4 appearing at the terminal 19 is supplied to the duration counter 5 as a negative-going pulse.

The Program And Duration Counters–(FIG. 2)

The counters 2 and 5, in the embodiment illustrated, are each constructed from a plurality of NAND gates, with pairs of gates being connected to form respective bistable flip-flop stages, and the output of one stage being connected to the input of the succeeding stage. The program counter illustrated employs four stages whereby the counter is operative to produce an output signal after a count of 8 has been reached, whereas the duration counter employs two flip-flop stages and is adapted to provide an output signal after a count of two has been reached.

As illustrated, each gate of each pair of gates 23a–23a', 23b–23', 23c–23c'and 23d–23d' has one of its two inputs cross-connected with the output of the other gate of such pair, with the remaining inputs being connected to respective capacitors 24, the opposite sides of which are connected to the preceding output. Thus, the input of the first flip-flop stage comprising the gates 23a–23a' is connected to the output terminal 19 of the oscillator 1, and each input of a succeeding flip-flop stage is connected to the preceding output of gate 23a, 23b or 23c as the case may be, with the output terminal 25 being connected to the output of the gate 23d'. The outputs of the respective gates 23a, 23b, 23c and 23d and associated gate inputs are connected to a reset line X through respective invertors 26 whereby, upon application of a positive voltage to such reset line, the respective stages of the counter will be set to zero.

The duration counter is of corresponding construction with the exception that only two flip-flop stages are provided, and the output terminal of the gate 23b' is therefore connected to the output terminal 25' of the counter, while the invertors 26 are operatively connected to the reset line Y.

Operation Of The Counters

Upon application of a positive voltage to the reset line X, the output of each gate 23a, 23b, 23c and 23d will be at a relatively low potential approaching ground potential, thereby placing the associated input of the cooperable gate at relatively high (positive) potential. The counter is enabled by application of low potential to the reset line, resulting in a positive voltage at the output of each invertor 26, the outputs of the associated gates, however, remaining at ground potential. As a result, upon application of a negative-going pulse at the input stage, the gate 23a will be triggered to reverse its output, resulting in a flipping of such stage. As the respective gates are responsive to negative-going pulses, the flipping of the output of the gate 23a, and as a result the appearance of a positive voltage thereat, will have no effect on the next stage. However, upon receipt of a second pulse at the input stage and flipping thereof, a negative-going pulse will appear at the associated input of the gate 23b, causing the second stage 23b–23' to flip. As successive negative-going pulses appearing at the inputs of the respective stages results in the flipping of such stage, upon the appearance of the eighth impulse at the terminal 19, the last stage comprising the gates 23d–23d' will flip, resulting in the appearance of a negative-going pulse at the output terminal 25 of the program counter.

The duration counter 5 operates in the same manner as described with respect to the program counter, with the exception that a negative-going pulse will appear at the counter output terminal 25' upon the appearance of a second pulse at the input of the counter.

The Output Decoder–(FIG. 2)

The output decoder 3 in the embodiment illustrated com-; rises a single flip-flop stage consisting ' NAND-gates 23e–23e', which are likewise cross-connected with the output of each gate connected to one of the inputs of the other gate, the remaining input of the gate 23e being connected to the output terminal 25 of the program counter, and the remaining input of the gate 23e' being connected to the output terminal 25' of the duration counter. The output terminal of the gate 23e forms the output of the decoder and is connected to the output terminal O thereof, with the output of such gate also being connected by reset line X to the corresponding reset line of the program counter 2, and by the disable line X to the disable terminal X of the oscillator 1. In like manner, the output of the gate 23e' is connected by the reset line Y to the corresponding reset line of the counter 5, and by the disable line Y to the corresponding disable terminal Y of the oscillator 4.

The output decoder 3 thus provides an output signal (high) at the terminal O thereof, whenever the output of the gate 23d' provides an output signal at the corresponding input of the gate 23e, at the same time applying reset voltage to the counter 2 and disable voltage to the oscillator 1. In like manner, the output terminal of the gate 23e' is then operative to apply enabling voltage over the reset line to the counter 5, and blocking voltage to the transistor 21 of the duration oscillator 4, thereby initiating operation of such oscillator. After the appearance of a second pulse at the input of the counter 5, the output terminal 25' of such counter will go low (ground), and thus also the associated input of the gate 23e', resulting in the flipping of stage 23e–23e' to its original condition, thereby disabling the oscillator 4, resetting the counter 5, and initiating operation of the oscillator 1 and counter 2.

With charging ranges between 2 and 10 minutes for the respective oscillators, a program time can be readily obtained, with the circuits above-described, which is continuously variable, for example, from approximately 22 minutes to 1 hour and 23 minutes, and with a duration time which is continuously variable from approximately 5 minutes to 19 minutes. Longer periods can be obtained by suitable modifications in the oscillator circuit, and an increase in the number of stages in the respective counters.

Figure 3:
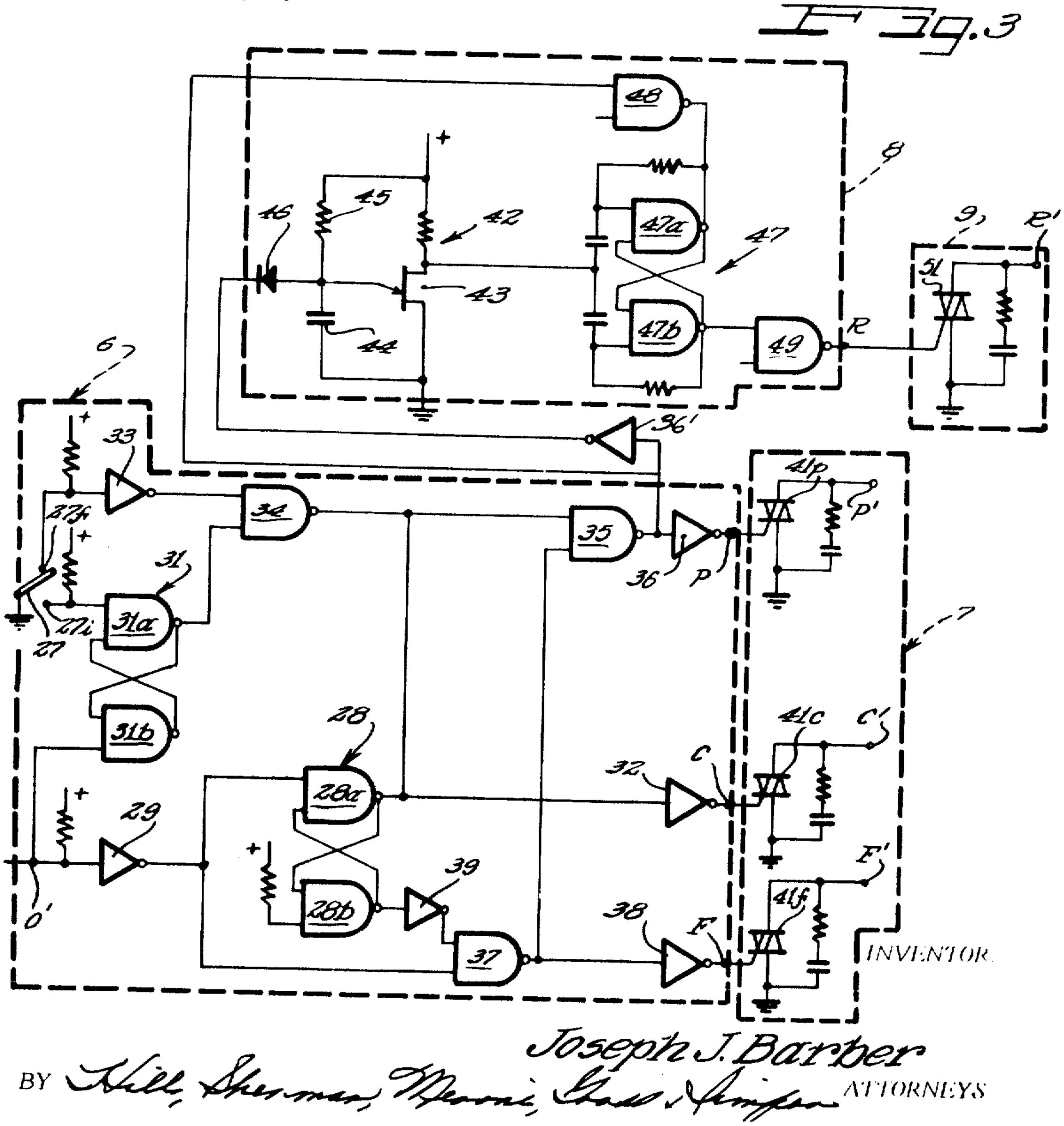
FIG. 3 is a schematic diagram of the remainder of the circuits illustrated in block form in FIG. 1.

Single Count Control Logic Circuit–(FIG. 3)

The logic circuit 6 is provided with, in addition to an input terminal O' and respective output terminals P, C and F, a "-function condition" input circuit 11 having two contacts 27f and 27i, adapted in the embodiment illustrated, to be selectively connected by a wiper arm 27, illustrated as being operatively connected to ground. For the purposes of illustration, it will be assumed that the wiper arm 27 is operatively connected for movement with a cyclically operating element of the mechanism to be controlled. It may be further assumed that at the start of a cycle of operation thereof the arm 27 will be on the contact 27f, and at an intermediate point of the operating cycle thereof, the arm will engage the contact 27i, returning to the contact 27f at completion of the operating cycle. Consequently, as soon as a duration cycle is initiated at the circuit 6 by the appearance of a corresponding signal at the input O' thereof, the output terminal P will be suitably energized, and in the event the arm 27 completes its proper travel to the contact 27i and returns to the contact 27f prior to the end of a duration cycle, the output C of the circuit will be suitably energized, indicating completion of the operation.

However, if the arm fails to leave the contact 27f during a cycle of operation, or having left the contact 27f, fails to reach the contact 27i, or having reached the same, fails to return to the contact 27f, the output terminal F will be suitably energized, upon the appearance of a signal at the input O', indicating the completion of a duration cycle, to indicate that there has been a failure in the desired operation.

Details Of Single Count Control Logic Circuit–(FIG. 3)

In the embodiment of the invention illustrated in FIG. 3 the logic circuit 6 comprises a plurality of NAND gates and invertors, with four of the NAND gates being circuited to form two bistable flip-flop stages. Thus, the flip-flop stage, indicated generally by the numeral 28, comprises NAND-gates 28a and 28b, each having their output and one input of the other cross-connected, with the other input of the gate 28b being permanently connected to positive potential over a suitable resistance. The other input of the gate 28a is operatively connected to the terminal O' through an invertor 29 with the input of the latter, and thus the terminal O' being connected to positive potential over a suitable resistance. Flip-flop stage, indicated generally by the numeral 31, comprises two NAND-gates 31a and 31b, each having their output and one input of the other cross-connected, with the other input of the gate 31b being connected to the terminal O' and the other input of the gate 31a being connected to the terminal 27i the latter terminal and associated input being connected to positive potential over a suitable resistance.

The output of the gate 28a is connected by invertor 32 with the output terminal C, while terminal 27f is connected by invertor 33 with an input of a NAND-gate 34, the other input of which is connected to the output of gate 31a. NAND-gate 35 has its output connected, by invertor 36, with the terminal P, while one input of the gate 35 is connected to the output of gate 34, as well as to the output of gate 28a. Another NAND-gate 37 has its output connected to the other input of the gate 35, and through invertor 38 to the terminal F. One input of the gate 37 is connected to the output of the invertor 29, while the other input of such gate is connected to the output of the gate 28b through invertor 39.

Assuming that the last cycle of the logic circuit was successfully completed, the arm 27 will be on terminal 27f, placing ground on the input of invertor 33, while the terminal 27i and associated input of gate 31a will be high, and the terminal O' will be low, as will the corresponding input of gate 31b and input of invertor 29. The output of the latter will, therefore, be high, as will the corresponding input of gates 28a and 37. The output of gate 28b will be high and as both inputs of gate 28a are, therefore, high, the output thereof will be low whereby the terminal G will be high, indication satisfactory completion of the preceding cycle. At the same time, as a result of the operation of invertor 39, the associated input of gate 37 will be low, resulting in the output of such gate being high. As a result thereof terminal F will be low, and as gate 35 has one low input and one high input, the output thereof will be high and the terminal P will, therefore, be low. It might be mentioned that while gate 34 will have one high and one low input, whereby the output thereof would be high, the output circuit is forced low by the output of gate 28a.

A new cycle will be initiated by change at the timer input O' from low to high. This will result in the input of gate 28, connected to the output of invertor 29, going low, which will result in flipping of the flip-flop stage 28, reversing the output condition thereof whereby the output of the gate 28a is high, resulting in the terminal C being low, and both inputs of gate 35 being high, whereby the output thereof will be low and terminal P will be high, thus signalling that a cycle is "in progress." At the same time terminal F will remain low. As the cycle commences in normal manner, the movable arm 27 will leave the terminal 27f, resulting in the input of invertor 33 going high and its output low, at which time both inputs to the gate 34 are, therefore, low and its output high. As contact arm 27 continues in the absence of a system failure, the arm will eventually engage terminal 27i, resulting in a flipping of the flip-flop 31 whereby the output of the gate 31a as well as the corresponding input of the gate 34 will go high. Assuming that the arm 27 completes its operational cycle, and thus returns to the terminal 27f, the input of the invertor 33 will go low and its output high whereby both inputs to the gate 34 are high, rendering its output low. This action will result in the output of gate 35 going high and the terminal P thus going low. At the same time the output circuit of gate 28a and thus the input of the invertor 32 will be forced low whereby the terminal C will be high, indicating successful completion of the cycle within the desired duration, and upon completion of the latter the timing input O' will again go low, returning the circuit to its original condition.

Assuming that a new cycle starts, in which condition the terminal P will be high and the remainder of the circuit as previously described, but the contact arm 27 due to a failure of the system never leaves terminal 27f, the circuit will remain in such condition until the end of the duration cycle, at which time the input O' will go low, whereby the output of invertor 29 will go high and therewith the associated input to the gates 28a and 37. While this will have no effect on the gate 28a, both inputs to the gate 37 will now be high, rendering the output thereof low which, in turn, will render the terminal F high to indicate system failure. At the same time the input of gate 35 associated with the output of gate 37 will, likewise, go low, resulting in the output of gate 35 going high and the terminal P going low.

The same results will take place in the event the contact arm 27 leaves terminal 27f but never reaches the terminal 27i. Likewise, if the arm 27 contacts the terminal 27i but never returns to the terminal 27f, while the flip-flop 31 will be reversed, this will have no effect on the overall operation and upon completion of the duration cycle and return of the timer input to low, terminal F will go high as previously described.

Indication And Power Control Means–(FIG. 3)

As described above, the output terminals P, C or F of the logic circuit 6 are in a signalling condition when the particular terminal is high and in a nonsignalling condition when the particular terminal is low. These conditions may be readily utilized in connection with indicating and control means as, for example, the circuits indicated generally by the numeral 7, illustrated in detail in FIG. 3. In the particular embodiment of the invention illustrated, the terminals P, C, F may each be connected to corresponding triac 41p, 41c and 41f, which may be utilized to actuate suitable signal lights as well as suitable system control means, for example, a solenoid which forms a part of the electrical circuit of the system involved. The output C', for example, may be utilized to actuate a green signal light, the output F' a red signal light and the output P' an amber signal light. Assuming that the output P' is also to control at least a part of the system involved, such output may also be utilized to actuate a solenoid or other responsive element.

Recycling Timer Circuit–(FIG. 3)

As the output P', energization of which represent the "in progress" condition of the logic circuit 6, provides a continuous operating condition, in the event the system involved requires an intermittent control condition of recycling timer circuit also may be provided.

The timer 8, in the embodiment illustrated in FIG. 3, comprises a relaxation oscillator 42 comprising a unijunction transistor 43 and a charging capacitor 44 which is adapted to be charged from the positive supply potential over a resistance 45 whereby the capacitor will charge until the firing point of the transistor 43 is reached, resulting in discharge of the capacitor therethrough and the appearance of a negative-going pulse in its output circuit. The capacitor 44 is also connected through a diode 46 and invertor 36' to the output of the gate 35 whereby the capacitor 44 will be shunted at the same time terminal P goes low, thereby disabling the oscillator. The output of the oscillator 42 is connected to the input of a flip-flop circuit 47 comprising a pair of NAND-gates 47a and 47b having cross-connected outputs and inputs with the output of the gate 47a being connected to the output of the gate 35 through an invertor 48, illustrated as comprising a NAND gate with only one of its inputs being utilized.

The output of gate 47b forms the output of the flip-flop stage 47 and is connected the output terminal R through an invertor 49, likewise illustrated as a NAND gate with only one of its inputs being utilized.

The output terminal R may be connected to suitable control and indicating means, as, for example, a triac 51, the output terminal R' being adapted to be connected to suitable indicating means as well as control means such as a solenoid for effecting intermittent control of the desired system element.

Operation Of Recycling Timer Circuit

It will be apparent that as long as the output of gate 35 is high and terminal P is low (no cycle in progress) the diode 46 will be conducting and the capacitor 44 will thus be shunted whereby the oscillator is disabled. Likewise, in view of the output of gate 35 being high, the output of the invertor 48 also will be low, and thus also the associated input of the gate 47b, whereby the output of the latter is high and the terminal R low. Consequently, the triac 51 will be nonconductive.

Upon initiation of a duration cycle the output of gate 35 will go low and output of invertor 36' high whereby the diode 46 will be nonconducting, permitting the capacitor 44 to begin charging and at the same time the output of the invertor 48 will tend to go high, but is dominated by the flip-flop stage 47, whereby the output of the gate 47a will remain low, with terminal R remaining low and the triac 51 nonactuated. When the capacitor 44 has charged to the firing voltage of the transistor 43 the capacitor will discharge therethrough and a negative-going pulse will be applied at the input of the flip-flop stage 47 and, in particular, at the associated input of the gate 47b, resulting in a flipping of such stage and the output of the gate 47b going low, which, in turn, will result in terminal R going high, actuation thereby of the triac 51 and energization of terminal R'. When the capacitor recharges to the firing point of transistor 43, the flip-flop stage will flip to its original condition and the output terminal R will go low, deactuating the triac 51 and deenergization of the terminal R'. The output terminal R' thus will alternately go high and low throughout the duration cycle and when the latter is completed the oscillator will be disabled and the circuit returned to its original starting position.

When the output of the gate 35 returns to high, at the completion of a duration cycle, the diode will again conduct, shunting the capacitor 44 and disabling the oscillator, at the same time the output of the invertor 48 will go low forcing the flip-flop stage, if it is not already in its rest or nonactuated condition, into such condition, whereby the output of gate 47b is high, the terminal R low and terminal R' deenergized.

It will be apparent from the above disclosure that I have provided a very efficient, flexible control system which may be very compactly produced, as the respective gates, invertors, etc. may be readily fabricated as integrated circuits. For example, four NAND gates or six invertors may be readily obtained in the form of respective very compact single integrated circuit assemblies. Thus, for example, the counter 2 may primarily comprise two such assemblies, each comprising four NAND gates, while the flip-flop stage 47 may comprise two such gates and the invertors 48 and 49 the other two gates of such a quad assembly.

It will also be appreciated that the specific control and indicator circuits, the arrangement of the "function condition" circuit and the specific details of the remaining circuit will be determined by the nature and operation of the system which the present invention is to control and the respective circuit will be constructed accordingly.

What I claim is:

1. In a variable timing and control circuit providing repetitive control periods of variable duration, at a variably repetitive rate, operative to govern a control and indicator circuit for indicating "completion" of a cycle, functional cycle "in progress" or functional "failure," and which is operable during the "in progress" functional cycle to provide either or both a continuous control function and a recycling intermittent control function, the combination of a pulse generator having a predetermined cycle of operation and operative to supply an output pulse at the end of each cycle thereof, a counter connected to said pulse generator operative to provide an output pulse after counting a predetermined number of output pulses from said pulse generator, a second pulse generator having a predetermined cycle of operation and operative to supply an output pulse at the end of each cycle thereof, a second counter, connected to said second pulse generator operative to provide an output pulse after counting a predetermined number of output pulses from said second pulse generator, and decoding means, having respective inputs connected to the outputs of said counters, operative upon receipt of an output pulse from a respective counter to provide a signal to disable operation of the pulse generator associated with such counter and enable the other pulse generator to initiate the start of a cycle thereof, means associated with the respective counters for resetting each counter following the end of a counting cycle thereof, said last-mentioned means being connected to said decoding means for actuation thereby, said decoding means having an output at which alternate "actuation" and "deactuation" timing signals appear in response to respective output pulses from said counters, a logic circuit comprising a pair of control inputs to which signals representing said respective predetermined conditions may be sequentially conducted, and a timing input, connected to said output of said decoding means, at which said alternate timing signals are supplied for respectively controlling actuation and deactuation of said logic circuit, the latter having a plurality of outputs arranged for connection to indicating means adapted to indicate functional "completion" of a cycle, functional cycle "in progress," or functional "failure," first means operatively connecting the timing input to the "failure" output, operative to maintain said output deenergized in the presence of an "actuation" timing signal, second means operatively connecting the timing output to the "completion" output operative, upon function completion in the presence of the particular "actuation" timing signal, to effect energization of said "completion" output, third means operatively connecting the output sides of said first and second means to the "in progress" output operative, prior to cycle completion, to maintain the latter output energized in the presence of an "actuation" timing signal, fourth means operatively connecting one of said control inputs to the connection of said second means with said third means operative, upon cycle completion, to render the "completion" output energized and the "in progress" output deenergized, fifth means operatively connecting the other of said control inputs with said fourth means operative, upon receipt of a predetermined signal, to prepare the fourth means for operation in the event a predetermined signal is received at said first control input prior to appearance of said deactuation signal at said timing input, sixth means operatively connecting said timing input and said fifth means for resetting said fifth means, if necessary, upon receipt of a deactuation signal at said timing input, and seventh means, operatively connecting said first and second means, for controlling said first means to maintain said "failure" and "in progress" outputs deenergized in the presence of a "deactuation" signal at said timing input and energization of said "completion" output, and a recycling timing circuit comprising a single count circuit, means for resetting said last-mentioned circuit connected to the "in progress" output operative to effect a resetting of said single count circuit when such output is in relatively deenergized condition, a pulse generator having its output connected to the input of said single count circuit, means operatively connected to said "in progress" output for disabling said last-mentioned pulse generator when such output is in relatively deenergized condition, last-mentioned pulse generator having a pulse interval which is considerably less than the interval between output pulses from said second counter, whereby said single count circuit will provide an intermittent output signal during continuous energization of said "in progress" output.

2. A timing and control circuit according to claim 1, wherein each of said pulse generators comprises a voltage charging circuit including a charging capacitor and means for adjustably varying a charging voltage on said capacitor, a unijunction transistor operatively connected to said capacitor and arranged to transmit a pulse in its output circuit when the charge on the capacitor reaches a predetermined value, and a transistor connected to shunt said capacitor when conductive, upon receipt at its base of a disabling signal from said decoding means.

3. A timing and control circuit according to claim 1 wherein said counters each comprise a plurality of NAND gates connected in pairs to form respective flip-flop stages which are serially connected, the output of one gate of each pair being operatively connected to said decoding means for receipt of a reset signal therefrom.

4. A timing and control circuit according to claim 1, wherein each of said pulse generators comprises a voltage charging circuit including a charging capacitor and means for adjustably varying a charging voltage on said capacitor, a unijunction transistor operatively connected to said capacitor and arranged to transmit a pulse in its output circuit when the charge on the capacitor reaches a predetermined value, and a transistor connected to shunt said capacitor when conductive, upon receipt at its base of a disabling signal from said decoding means, and wherein said counters each comprise a plurality of NAND gates connected in pairs to form respective flip-flop stages which are serially connected, the output of one gate of each pair being operatively connected by an invertor to said decoding means for receipt of a reset signal therefrom.

5. A timing and control circuit according to claim 1 wherein said decoding means comprises a pair of NAND gates, each having its output cross-connected with one input of the other gate of such pair, and the other inputs connected with the outputs of the respective counters, the output of one gate forming the output for the decoding means and providing the reset signal for the counter connected thereto and the disable signal for the generator connected to such counter, the output of the other gate of such pair providing the disable and reset signals for the other generator and counter connected thereto.

6. A timing and control circuit according to claim 1 wherein the pulse generator of said recycling timing circuit comprises a voltage charging circuit including a charging capacitor and means for applying a charging voltage thereto, and a unijunction transistor operatively connected to said capacitor and arranged to transmit a pulse in its output circuit when the charge on the capacitor reaches a predetermined value, and said single count circuit comprises a pair of NAND gates, each having its output cross-connected with one input of the other gate of such pair, and the other inputs connected with the output of the pulse generator of said recycling timing circuit, the output of one of the latter gates forming the output for said circuit, and a triac, to which said last-mentioned gate output is connected, which triac forms the responsive output control element of said single count circuit.

7. A timing and control circuit according to claim 1 wherein said decoding means comprises a pair of NAND gates, each having its output cross-connected with one input of the other gate of such pair, and the other inputs connected with the outputs of the respective counters, the output of one gate forming the output for the decoding means and providing the reset signal for the counter connected thereto and the disable signal for the generator connected to such counter, the output of the other gate of such pair providing the disable and reset signals for the other generator and counter connected thereto, said pulse generator of said recycling timing circuit comprising a voltage-charging circuit including a charging capacitor and means for applying a charging voltage thereto, and a unijunction transistor operatively connected to said capacitor and arranged to transmit a pulse in its output circuit when the charge on the capacitor reaches a predetermined value, and said single count circuit comprises a pair of NAND gates, each having its output cross-connected with one input of the other gate of such pair, and the other inputs connected with the output of the pulse generator of said recycling timing circuit, the output of one of the latter gates forming the output for said circuit, and a triac, to which said last-mentioned gate output is connected, which triac forms the responsive output control element of said single count circuit.

8. In a timing and control circuit according to claim 1, wherein said first through seventh connecting means of said logic circuit respectively comprise NAND gates, in which said second and seventh NAND gates each have their outputs cross-connected with a respective input of the other, and said fifth and sixth NAND gates have their outputs cross-connected with a respective input of the other, and respective invertors, one of which connects the associated control input to the cooperable input of the gate comprising said fourth connecting means, a second invertor connecting said timing input with the cooperable inputs of the gates comprising said second and seventh connecting means, and a third invertor connecting the output of the gate comprising said seventh connecting means with the cooperable input of the gate comprising said first connecting means.

9. A timing and control circuit according to claim 1, wherein said outputs of said logic circuit each include a triac as the responsive control element of such output.

10. A timing and control circuit according to claim 4, wherein said decoding means comprises a pair of NAND gates, each having its output cross-connected with one input of the other gate of such pair, and the other inputs connected with the outputs of the respective counters, the output of one gate forming the output for the decoding means and providing the reset signal for the counter connected thereto and the disable signal for the generator connected to such counter, the output of the other gate of such pair providing the disable and reset signals for the other generator and counter connected thereto.

11. A timing and control circuit according to claim 4, wherein the pulse generator of said recycling timing circuit comprises a voltage charging circuit including a charging capacitor and means for applying a charging voltage thereto, and a unijunction transistor operatively connected to said capacitor and arranged to transmit a pulse in its output circuit when the charge on the capacitor reaches a predetermined value, and said single count circuit comprises a pair of NAND gates, each having its output cross-connected with one input of the other gate of such pair, and the other inputs connected with the output of the pulse generator of said recycling timing circuit, the output of one of the latter gates forming the output for said circuit, and a triac, to which said last-mentioned gate output is connected, which triac forms the responsive output control element of said single count circuit.

12. A timing and control circuit according to claim 4, wherein said decoding means comprises a pair of NAND gates, each having its output cross-connected with one input of the other gate of such pair, and the other inputs connected with the outputs of the respective counters, the output of one gate forming the output for the decoding means and providing the reset signal for the counter connected thereto and the disable signal for the generator connected to such counter, the output of the other gate of such pair providing the disable and reset signals for the other generator and counter connected thereto, said pulse generator of said recycling timing circuit comprising a voltage-charging circuit including a charging capacitor and means for applying a charging voltage thereto, and a unijunction transistor operatively connected to said capacitor and arranged to transmit a pulse in its output circuit when the charge on the capacitor reaches a predetermined value, and said single count circuit comprises a pair of NAND gates, each having its output cross-connected with one input of the other gate of such pair, and the other inputs connected with the output of the pulse generator of said recycling timing circuit, the output of one of the latter gates forming the output for said circuit, and a triac, to which said last-mentioned gate output is connected, which triac forms the responsive output control element of said single count circuit.

13. In a timing and control circuit according to claim 4, wherein said first through seventh connecting means of said logic circuit respectively comprise NAND gates, in which said second and seventh NAND gates each have their outputs cross-connected with a respective input of the other, and respective invertors, one of which connects the associated control input to the cooperable input of the gate comprising said fourth connecting means, a second invertor connecting said timing input with the cooperable inputs of the gates comprising said second and seventh connecting means, and a third invertor connecting the output of the gate comprising said seventh connecting means with the cooperable input of the gate comprising said first connecting means.

14. A timing and control circuit according to claim 4, wherein said outputs of said logic circuit each include a triac as the responsive control element of such output.

15. In a circuit for controlling cyclic functional operation of a system having means responsive to predetermined conditions of the system, the combination of control input means to which signals representing predetermined conditions may be conducted, and a timing input to which a pair of timing signals may be alternately supplied, a plurality of outputs arranged for response under predetermined functional conditions of such a system, first means operatively connecting the timing input to a first of said outputs, operative to maintain said output deenergized in the presence of one of said timing signals, second means operatively connecting the timing output to a second of said outputs, operative in the presence of predetermined conditions at said control input means and in the presence of said one of the timing signals to effect energization of said second output, third means operatively connecting the output sides of said first and second means to a third of said outputs, operative under predetermined conditions at said control input means to maintain said third output energized in the presence of said one of the timing signals, fourth means operatively connecting said control input means to the connection of said second means with said third means, operative under predetermined conditions at said control input means to render the second output energized and the third output deenergized, fifth means operatively connecting said control input means with said fourth means, operative upon receipt of a predetermined signal to prepare the fourth means for operation in the event a predetermined signal is received at said control input means prior to appearance of the other of said timing signals at said timing input, sixth means for resetting said fifth means, if necessary, upon receipt of said other of said timing signals at said timing input, and seventh means operatively connecting said first and second means for controlling said first means to maintain said first and third outputs energized in the presence of said other of the timing signals at said timing input and energization of said second output.

16. A control circuit according to claim 15 wherein said first through seventh connecting means of said logic circuit respectively comprise NAND gates, in which said second and seventh NAND gates each have their outputs cross-connected with a respective input of the other, and said fifth and sixth NAND gates have their outputs cross-connected with a respective input of the other, and respective inverters, one of which connects the associated control input to the cooperable input of the gate comprising said fourth connecting means, a second inverter connecting said timing input with the cooperable inputs of the gates comprising said second and seventh connecting means, and a third inverter connecting the output of the gate comprising said seventh connecting means with the cooperable input of the gate comprising said first connecting means.

17. In a variable timing and control circuit providing repetitive control periods at spaced intervals operative to govern a control and indicator circuit for indicating "completion" of a cycle, functional cycle "in progress" or functional "failure," and which is operable during the "in progress" functional cycle to provide both a continuous control function and a recycling, intermittent control function for a system having means responsive to two predetermined conditions of the system, the combination of means for alternately supplying one of a pair of timing signals, each representative of a respective time interval of predetermined duration, a logic circuit comprising a pair of control inputs to which signals representing said respective predetermined system conditions may be sequentially conducted, and a timing input connected to said first-mentioned means, at which said alternate timing signals are supplied for respectively controlling actuation and deactuation of said logic circuit, the latter having a plurality of outputs arranged for connection to indicating means adapted to indicate functional "completion" of a cycle, functional cycle "in progress," or functional "failure," first means operatively connecting the timing input to the "failure" output, operative to maintain said output deenergized in the presence of an "actuation" timing signal, second means operatively connecting the timing input to the "completion" output operative, upon function completion in the presence of the particular "actuation" timing signal, to effect energization of said "completion" output, third means operatively connecting the output sides of said first and second means to the "in progress" output operative prior to cycle completion to maintain the latter output energized in the presence of an "actuation" timing signal, fourth means operatively connecting one of said control inputs to the connection of said second means with said third means operative, upon cycle completion, to render the "completion" output energized and the "in progress" output deenergized, fifth means operatively connecting the other of said control inputs with said fourth means operative, upon receipt of a predetermined signal, to prepare the fourth means for operation in the event a predetermined signal is received at said first control input prior to appearance of said deactuation signal at said timing input, sixth means operatively connecting said timing input and said fifth means for resetting said fifth means, if necessary, upon receipt of a deactuation signal at said timing input, and seventh means, operatively connecting said first and second means, for controlling said first means to maintain said "failure" and "in progress" outputs deenergized in the presence of a "deactuation" signal at said timing input and energization of said "completion" output, and a recycling timing circuit connected to the "in progress" output operative to provide an intermittent output signal during continuous energization of said "in progress" output.

18. A variable timing and control circuit according to claim 17, wherein said recycling timing circuit comprises a single count circuit, means for resetting said single count circuit connected to the "in progress" output operative to effect a resetting of such circuit when said "in progress" output is in relatively deenergized condition, a pulse generator having its output connected to the input of said single count circuit, means operatively connected to said "in progress" output for disabling said last-mentioned pulse generator when such output is in relatively deenergized condition, said last-mentioned pulse generator having a pulse interval which is considerably less than the interval between output pulses from said second counter.

19. A recycling timing circuit, comprising a pulse generator having a voltage charging circuit including a charging capacitor and means for applying a charging voltage thereto, and a unijunction transistor operatively connected to said capacitor and arranged to transmit a pulse in its output circuit when the charge on the capacitor reaches a predetermined value, and a single count circuit comprising a pair of NAND gates, each having its output cross-connected with one input of the other gate of such pair, and the other inputs connected with the output of the pulse generator of said recycling timing circuit, the output of one of the latter gates forming the output for said circuit, and the output of the other NAND gate forming the input for signals for resetting said single count circuit, and an independent input circuit connected to said transistor for rendering the latter inoperative in the presence of a disabling signal at said input circuit irrespective of the amount of charge on said capacitor.